July 22, 1930.    H. J. SULLIVAN    1,771,276
VEHICLE SHOCK ABSORBER OR DOORCHECK
Filed Sept. 14, 1929    2 Sheets-Sheet 1
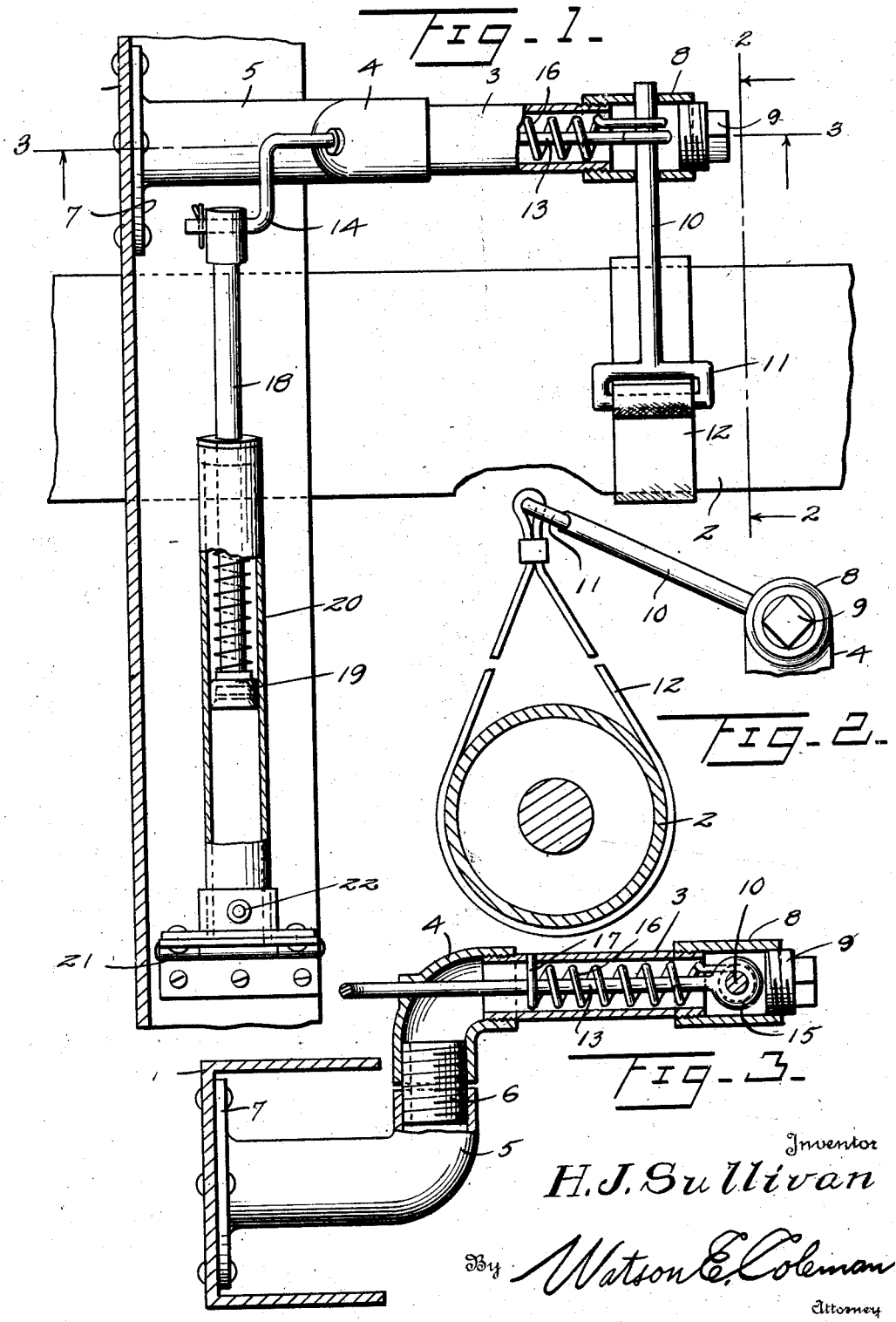

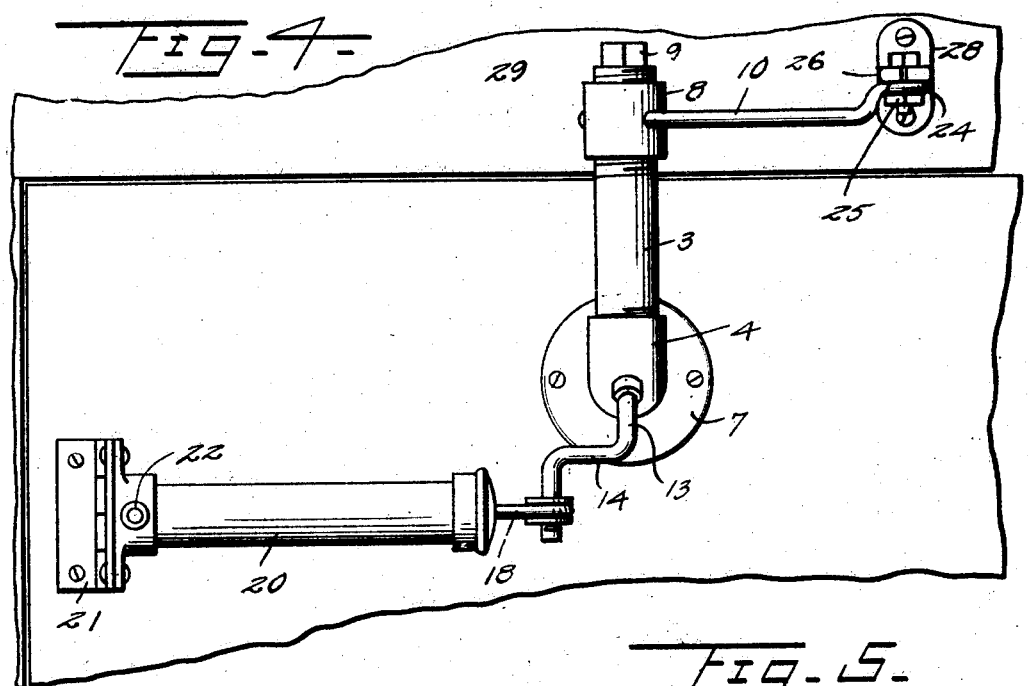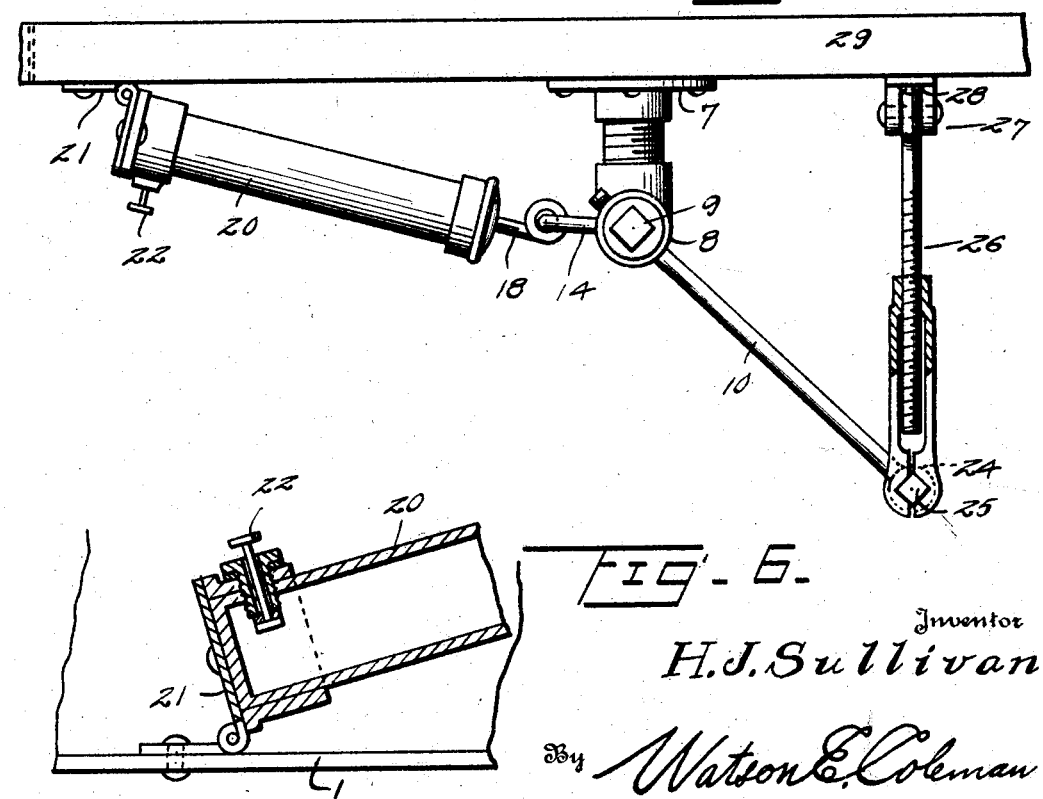

Patented July 22, 1930

1,771,276

UNITED STATES PATENT OFFICE

HENRY J. SULLIVAN, OF JERSEY CITY, NEW JERSEY

VEHICLE SHOCK ABSORBER OR DOORCHECK

Application filed September 14, 1929. Serial No. 392,670.

This invention relates to improvements in movement checking devices more particularly devices adapted for use upon motor or other vehicles for checking a rebound or for use as a check for a door to prevent slamming of the same.

The primary object of the present invention is to provide a shock absorbing device wherein free movement in one direction of an attached movable structure may be had and the forced return movement of the structure in the opposite direction may be so controlled as to prevent shocks or jars being transmitted thereto at the termination of its movement.

The invention broadly contemplates the provision of a cylindrical body housing, a coiled spring and a shaft passing through the spring and attached at one end thereto. That end of the shaft opposite the end to which the spring is attached is formed to provide a crank which has connected thereto a piston operating in a cylinder having a bleed valve opening therefrom so as to permit only slow movement of the piston in one direction therein. Connected with the shaft and said coiled spring is an oscillating arm which is adapted to be attached to a body which has movement relative to the body upon which the cylinder is mounted. When the device is used as a vehicle shock absorber the arm is attached to a vehicle axle and the cylinder and spring housing are mounted upon the vehicle frame and upon movement of the axle relative to the frame the coiled spring is placed under tension and the piston moving in the cylinder traps air therein which slowly bleeds from said valve and thus prevents violent movement of the vehicle axle relative to the frame.

The invention will be best understood from a consideration of the following detailed description taken in connection with the accompanying drawing forming part of the present specification, with the understanding however that the invention is not confined to any strict conformity with the showing of the drawing but may be changed or modified so long as such changes or modifications mark no material departure from the salient features of the invention as expressed in the appended claims.

In the drawing:—

Figure 1 shows the application of the check embodying the present invention to a motor vehicle chassis to serve as a shock absorber;

Figure 2 is a sectional view taken on the line 2—2 of Figure 1;

Figure 3 is a sectional view taken on the line 3—3 of Figure 1;

Figure 4 is a view showing the application of the device to a door to serve as a check therefor;

Figure 5 is a top plan view of the structure as shown in Figure 4;

Figure 6 is a longitudinal sectional view through the hinged end of the check cylinder and the valve thereof.

Referring more particularly to the drawings wherein like numerals of reference indicate corresponding parts throughout the several views Figures 1 to 3 show the application of the device to a motor vehicle frame for use as a shock absorber. In these figures the numeral 1 indicates a portion of a vehicle chassis frame, a portion of an axle being indicated by the numeral 2. The present shock absorber consists of a metal casing 3 having secured to one end a right angular extension which in the present case is shown as a pipe coupling 4 and to the end of this coupling a similar coupling 5 is connected by means of an interposed nipple 6, the coupling 5 having its free end directed in a line parallel with the tubular casing 3 and attached to a mounting plate 7 which, when the device is employed as a shock absorber, is secured as shown to the inner face of the vehicle chassis frame directly above the axle 2.

Suitably swivelly mounted upon the other end of the casing 3 is a cap 8 the end face of which has threaded thereinto a plug 9 by means of which access may be had to the interior of the casing as shown in Figure 1.

Extended radially through the cap 8 is one end of an arm 10 the other end of which is formed as indicated at 11 to have a suitable strap 12 connected thereto for establishing connection between the arm and the underlying axle 2.

Extending longitudinally through the casing 3 is an oscillatable shaft 13 which at one end passes through the angular extension or coupling 4 and terminates exteriorly thereof in the crank 14. The other end of this shaft is formed to provide an eye 15 through which the arm 10 passes, this eye 15 being of course located in the cap 8.

Within the casing 3 and surrounding the shaft 13 is a coiled spring 16 one end of which is extended into the cap 8 and secured to the arm 10 in the manner shown while the opposite end is suitably secured to the wall of the casing 13 as for example by extending the end through the wall of the casing as indicated at 17.

Connected with the crank 14 is one end of a piston rod 18 the other end of which carries a piston 19 which is housed in a cylinder 20. The end of the cylinder 20 opposite that through which the rod 18 passes has one leaf of a hinge 21 secured thereto, the other leaf being suitably mounted upon the chassis frame in the manner shown. In the mounting of the shock absorber the cylinder 20 is arranged upon the same side of the casing 3 as the arm 10 so that when a downward pull is exerted upon the free end of the arm the shaft 13 will be oscillated so as to move the rod 18 into the cylinder 20. It will thus be seen that when the vehicle to which the shock absorber is attached passes over an obstruction or makes any movement which will cause the axle 2 to move closer to the chassis frame 1 the shock absorber will remain inactive but upon the rebound of the vehicle springs which will cause the axle and frame to move apart rapidly the arm 10 will be pulled down to force the piston 19 into the cylinder in the manner described and this movement of the axle away from the frame will be checked due to the resistance offered to the free movement of the piston in the cylinder by the air trapped in the cylinder. In order to permit the slow escape of air from the cylinder 20 a bleed valve 22 is placed at the inner end of the cylinder and this valve may be adjusted to regulate the escape of air therethrough.

In Figures 4 to 6 the device is shown in use as a door check and in addition to the structure just described, the same numerals being applied to the device in these figures as were used in describing it as a shock absorber, the plate 7 is secured to the top of the door body and the hinge 21 of the cylinder 20 is also secured to the door body but the cylinder is here directed oppositely to the arm 10. The casing 3 is vertically arranged and so positioned that the cap extends slightly above the door which is indicated generally by the numeral 23.

The outer end of the arm 10 is slightly modified so as to provide a flattened apertured tip 24 and to this end is secured a stud 25 to which one end of a turn buckle link 26 is attached, the other end of the link terminating in a ball 27 which is secured in a suitable socket bracket 28 which is in turn secured to the door frame 29 above the door.

From the foregoing description of the check as used upon a door it will be readily seen that upon swinging the door open a pull will be exerted upon the arm 10 oscillating the shaft 13 to draw the piston rod 18 out of the cylinder 20 at the same time twisting and placing under tension the spring 16. Upon release of the door the spring will tend to move the same to closed position and the piston will be shifted in the opposite direction in the cylinder 20 trapping air in the inner end thereof which will be bled therefrom through the valve 22. It will thus be seen that the spring will act as a door closer and the air cushion formed between the cylinder and piston will prevent the too violent operation of the spring in the performance of its function.

Having thus described my invention, what I claim is:—

1. A check for controlling relative movement between two bodies, comprising an oscillatable shaft, an arm extending from the shaft and adapted to be connected to one of the bodies, resilient means connected with one end of the arm and placed under tension upon oscillation of the arm and shaft in one direction, and means connected to the shaft acting in a path transversely thereof to oppose the reverse movement of the same by said tension means.

2. A check for controlling relative movement between two bodies, comprising an oscillatable shaft formed to provide a crank at one end, an arm attached at one end to the other end of the shaft, means for connecting said arm to one of said bodies, a resilient element placed under tension upon movement of the arm in one direction, and a cushioning element connected with said crank and opposing the return movement of the arm by the resilient means, said cushioning element being connected to the other of the two bodies.

3. A check for controlling relative movement between two bodies, comprising an oscillatable shaft formed to provide a crank at one end, an arm attached at one end to the other end of the shaft, means for connecting said arm to one of said bodies, a resilient element placed under tension upon movement of the arm in one direction, a cylinder adapted to be oscillatably mounted upon the other of said bodies, and a piston reciprocable in the cylinder and connected to said crank for movement thereby.

4. A check for controlling relative movement between two bodies, comprising a casing adapted to be mounted upon one of the bodies, a shaft oscillatably mounted in the casing and extending therefrom at one end and formed to provide a crank, an arm connected at one end to the other end of the shaft and swingably mounted on the casing, a spring member within the casing connected thereto at one end and having its other end connected to the arm, means for connecting the other end of said arm to the other of said bodies and means connected to the crank for controlling the oscillation of the shaft under the action of said spring.

5. A check for controlling relative movement between two bodies, comprising a tubular casing, means for mounting the same at one end upon one of said bodies, a cap rotatably mounted upon the other end of the casing, an arm having one end extended through said cap, means for connecting the other end of said arm with the other of the bodies, a shaft extending longitudinally through the casing and connected at one end to said arm, the other end thereof extending from the casing and terminating in a crank, a coiled spring surrounding said shaft in the casing and having one end connected to said arm, the other end of the spring being connected to the casing, a cylinder hingedly mounted at one end to the first mentioned one of said bodies, a piston operating in said cylinder and connected to said crank, and an air bleed valve at the inner end of said cylinder.

6. A check for controlling relative movement between two bodies, comprising a tubular casing, means for mounting the same at one end upon one of said bodies, a cap rotatably mounted upon the other end of the casing, an arm having one end extended through said cap, an adjustable link pivotally connected at one end to the other end of said arm, means for connecting the other end of said link with the other of said bodies, a shaft extending longitudinally through the casing and connected at one end to said arm, the other end thereof extending from the casing and terminating in a crank, a coiled spring surrounding said shaft in the casing and having one end connected to said arm, the other end of the spring being connected to the casing, a cylinder hingedly mounted at one end to the first mentioned one of said bodies, a piston operating in said cylinder and connected to said crank, and an air bleed valve at the inner end of said cylinder.

In testimony whereof I hereunto affix my signature.

HENRY J. SULLIVAN.